United States Patent
Dou

(10) Patent No.: US 10,951,816 B2
(45) Date of Patent: Mar. 16, 2021

(54) METHOD AND APPARATUS FOR PROCESSING IMAGE, ELECTRONIC DEVICE AND STORAGE MEDIUM

(71) Applicant: BEIJING XIAOMI MOBILE SOFTWARE CO., LTD., Beijing (CN)

(72) Inventor: Zifei Dou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/553,514

(22) Filed: Aug. 28, 2019

(65) Prior Publication Data

US 2020/0077020 A1    Mar. 5, 2020

(30) Foreign Application Priority Data

Aug. 31, 2018  (CN) .......................... 201811011052.3

(51) Int. Cl.
   *H04N 5/232*   (2006.01)
   *H04N 9/04*    (2006.01)

(52) U.S. Cl.
   CPC ... *H04N 5/23232* (2013.01); *H04N 5/232935* (2018.08); *H04N 5/232939* (2018.08); *H04N 9/04551* (2018.08)

(58) Field of Classification Search
   CPC .......... H04N 5/23232; H04N 5/232939; G06T 2207/20221; G06T 5/50
   See application file for complete search history.

(56) References Cited

U.S. PATENT DOCUMENTS

| 2002/0099119 | A1  | 7/2002  | Craig et al. | |
| 2003/0142871 | A1* | 7/2003  | Ishikawa | H04N 21/4335 382/233 |
| 2013/0038761 | A1* | 2/2013  | Tanaka | H04N 9/045 348/242 |
| 2014/0340553 | A1* | 11/2014 | Kuang | H04N 5/35563 348/302 |

(Continued)

FOREIGN PATENT DOCUMENTS

| CN | 102256051 A | 11/2011 |
| CN | 104486602 A | 4/2015 |

(Continued)

OTHER PUBLICATIONS

Extended European Search Report issued in EP Application No. 19194427.1 dated Feb. 7, 2020, (7p).

(Continued)

*Primary Examiner* — Ahmed A Berhan
(74) *Attorney, Agent, or Firm* — Arch & Lake LLP

(57) ABSTRACT

A method, an electronic device, and a storage medium are provided for processing an image. The method includes: at least one first image frame is acquired based on a first pixel arrangement pattern when receiving a photographing instruction, where a pixel in the first pixel arrangement pattern includes sub-pixels of the same color component distributed in a square array in a photosensitive element; at least one second image frame is acquired based on a second pixel arrangement pattern, where the second pixel arrangement pattern is a standard Bayer arrangement pattern; and the at least one first image frame and the at least one second image frame are fused to obtain the image to be displayed.

14 Claims, 9 Drawing Sheets

(56) References Cited

U.S. PATENT DOCUMENTS

2016/0050354 A1    2/2016  Musatenko et al.
2018/0357750 A1*  12/2018  Chen .................... G06T 3/4038

FOREIGN PATENT DOCUMENTS

| CN | 105791659 A | 7/2016 | |
|---|---|---|---|
| JP | 2017118329 A | 6/2017 | |
| WO | 2018137267 A1 | 8/2018 | |
| WO | WO-2018137267 A1 * | 8/2018 | ............. H04N 5/235 |

OTHER PUBLICATIONS

Chenyan Bai et al, "Automatic Design of Color Filter Arrays in the Frequency Domain", IEEE Transactions on Image Processing, vol. 25, No. 4, Apr. 2016, (15p).

* cited by examiner

| G | R | G | R |
|---|---|---|---|
| B | G | B | G |
| G | R | G | R |
| B | G | B | G |

FIG. 1C

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

FIG. 1D

METHOD AND APPARATUS FOR PROCESSING IMAGE, ELECTRONIC DEVICE AND STORAGE MEDIUM

CROSS REFERENCE TO RELATED APPLICATIONS

This application is based upon and claims priority to Chinese Patent Application No. 201811011052.3 filed on Aug. 31, 2018, the entire content of which is incorporated herein by reference.

TECHNICAL FIELD

The present disclosure relates to the field of image processing technology, and more particularly to a method and an apparatus for processing an image, an electronic device and a storage medium.

BACKGROUND

In the related art, the resolution of an image captured by an electronic device such as a mobile phone through a front camera differs depending on ambient lighting. By adjusting the resolution, high resolution in high light environment and high image quality in low light environment can be achieved. However, in the high light environment, to ensure the high resolution of the image, the image quality may be lost. In the low light environment, to ensure the image quality, the image resolution may be lost. Therefore, such photographing method cannot take into account both of the image quality and the image resolution.

SUMMARY

In order to overcome the problems existing in the related art, embodiments of the present disclosure provide a method and an apparatus for processing an image, an electronic device and a storage medium, which can balance image resolution and light sensitivity to achieve image quality enhancement.

According to a first aspect of the embodiments of the present disclosure, a method of processing an image is provided, including: acquiring at least one first image frame based on a first pixel arrangement pattern when receiving a photographing instruction, wherein a pixel in the first pixel arrangement pattern includes sub-pixels of the same color component distributed in a square array in a photosensitive element; acquiring at least one second image frame based on a second pixel arrangement pattern, wherein the second pixel arrangement pattern is a standard Bayer arrangement pattern; and fusing the at least one first image frame and the at least one second image frame to obtain an image to be displayed.

According to a second aspect of the embodiments of the present disclosure, an apparatus for processing an image is provided, including: a first acquisition module configured to acquire at least one first image frame based on a first pixel arrangement pattern when receiving a photographing instruction, wherein a pixel in the first pixel arrangement pattern includes sub-pixels of the same color component distributed in a square array in a photosensitive element; a second acquisition module configured to acquire at least one second image frame based on a second pixel arrangement pattern, wherein the second pixel arrangement pattern is a standard Bayer arrangement pattern; and an image fusion module configured to fuse the at least one first image frame and the at least one second image frame to obtain an image to be displayed.

According to a third aspect of the embodiments of the present disclosure, a non-transitory computer readable storage medium is provided, wherein the computer readable storage medium stores computer instructions, when invoking the computer instructions, a processor is configured to execute the method of processing an image provided in the above-described first aspect.

According to a fourth aspect of the embodiments of the present disclosure, an electronic device is provided, including: a processor; and a memory configured to store processor executable instructions. The processor is configured to execute the method of processing an image provided in the above-described first aspect.

It should be appreciated that the foregoing general description and the following detailed description are for explanatory purposes only, and are not intended to limit the invention in any manner.

BRIEF DESCRIPTION OF DRAWINGS

The drawings herein, which are incorporated into the specification and form a part of this specification, show the embodiments in accordance with the present disclosure and are used together with the specification to explain the principles of the present disclosure.

FIG. 1C is a schematic view illustrating a first pixel arrangement pattern in the embodiment shown in FIG. 1A;

FIG. 1D is a schematic view illustrating a second pixel arrangement pattern in the embodiment shown in FIG. 1A;

DETAILED DESCRIPTION

Reference is made in detail to exemplary aspects, examples of which are illustrated in the accompanying drawings. The following description refers to the accompanying drawings in which the same or like numerals in different drawings represent the same or similar elements unless otherwise indicated. The implementations set forth in the following description of exemplary aspects do not represent all implementations consistent with the disclosure. Instead, they are merely examples of apparatuses and methods consistent with aspects related to the disclosure.

The terminology used in the present disclosure is for the purpose of describing particular examples only and is not intended to limit the present disclosure. As used in this disclosure and the appended claims, the singular forms "a", "an", and "the" are intended to include the plural forms as well, unless the context clearly indicates otherwise. It should also be understood that the term "and/or" as used herein refers to and includes any and all possible combinations of one or more of the associated listed items.

It should be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figures 1A, 1B:
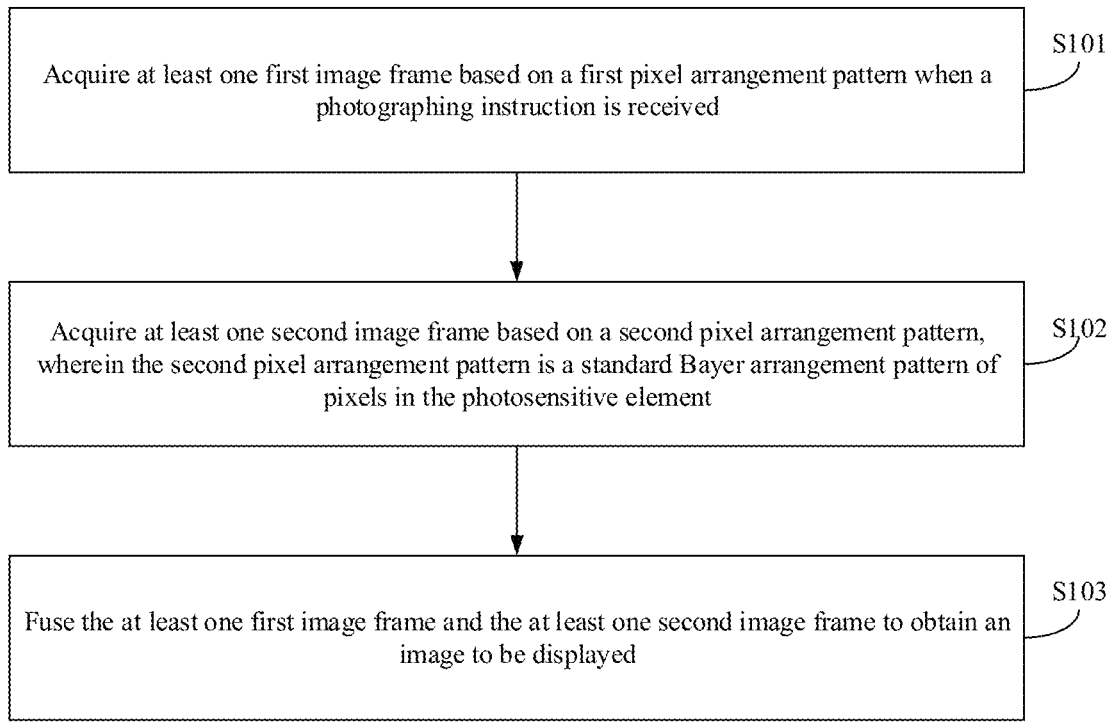
FIG. 1A is a flowchart illustrating a method of processing an image according to an exemplary embodiment.
FIG. 1B is a schematic view illustrating a pixel arrangement pattern in a photosensitive element in the embodiment shown in FIG. 1A.

FIG. 1A is a flowchart illustrating a method of processing an image according to an exemplary embodiment. FIG. 1B is a schematic view illustrating an inherent pixel arrangement pattern in a photosensitive element in the embodiment shown in FIG. 1A. FIG. 1C is a schematic view illustrating a first pixel arrangement pattern in the embodiment shown in FIG. 1A. FIG. 1D is a schematic view illustrating a second pixel arrangement pattern in the embodiment shown in FIG. 1A. The method of processing an image may be applied to an electronic device such as a smart phone, a tablet computer and a digital camera, and may be implemented by a camera application (APP) on the electronic device. As shown in FIG. 1A, the method of processing an image includes the following steps S101-S103.

In step S101, at least one first image frame is acquired based on a first pixel arrangement pattern when a photographing instruction is received, wherein the first pixel arrangement pattern distributes pixels of the same color component in a square array in a photosensitive element. For example, a pixel in the first pixel arrangement pattern includes sub-pixels of the same color component distributed in a square array in a photosensitive element. In one or more embodiments, each pixel in the first pixel arrangement pattern may include sub-pixels of the same color component distributed in a square array in a photosensitive element.

In an embodiment, the square array may be an N×N array, wherein N is greater than or equal to 2. As shown in FIGS. 1B and 1C, a square array of 2×2 is described as an example. The inherent pixel arrangement pattern in the photosensitive element includes a 4 in 1 pixel arrangement pattern, that is, a 2×2 array corresponding to the same color component is used as a large pixel. Based on the color component in the 2×2 array shown in FIG. 1B, the color component of the large pixel corresponding to the 2×2 array can be determined, thereby obtaining the first pixel arrangement pattern shown in FIG. 1C. The first pixel arrangement pattern described in the present disclosure may be referred to as a Quad Bayer arrangement pattern. In an embodiment, the data of at least one raw image frame as shown in FIG. 1B is collected by the photosensitive element such as an image sensor, and the data of each of the at least one raw image frame is arranged in the first pixel arrangement pattern shown in FIG. 1C to obtain at least one first image frame.

In step S102, at least one second image frame is acquired based on a second pixel arrangement pattern, wherein the second pixel arrangement pattern is a standard Bayer arrangement pattern of pixels in the photosensitive element. The standard Bayer arrangement pattern is an arrangement of photosites (pixels) on a digital image sensor that takes advantage of the fact that green pixels hold more picture information that red or blue pixels do. Most image sensors use a combination of red, green and blue photosite pixels that are sensitive to one spectrum of color each and in the Bayer pattern of arranging pixels you get double the amount of green pixels which allows for better image quality when compared to an image sensor with equal distributions of Red, Green and Blue (RGB) pixels. The standard Bayer arrangement pattern includes 50% green pixels, 25% red pixels, and 25% blue pixels.

In an embodiment, the standard Bayer arrangement pattern is as shown in FIG. 1D. The data of at least one raw image frame as shown in FIG. 1B is collected by the photosensitive element, and the data of each of the at least one raw image frame is re-arranged according to the second pixel arrangement pattern shown in FIG. 1D to obtain at least one second image frame.

In an embodiment, the at least one first image frame and the at least one second image frame are obtained from the data of different raw image frames as long as the at least one first image frame and the at least one second image frame are captured for the same subject.

In step S103, the at least one first image frame and the at least one second image frame are fused to obtain an image to be displayed.

In an embodiment, at least one first RGB (red, green and blue) image frame may be obtained by interpolating each of the at least one first image frame, and at least one second RGB image frame may be obtained by interpolating each of the at least one second image frame. Then, the at least one first RGB image frame and the at least one second RGB image frame are fused to obtain an image to be displayed on a user interface of the camera application.

In this embodiment, one pixel on the first image frame is obtained by four pixels of the same color component in the photosensitive element, which is equivalent to increasing the photosensitive area of pixels, so that the first image frame has a low resolution and a high light sensitivity. The second image frame is obtained by performing pixel rearrangement on inherent pixels in the photosensitive element, which is equivalent to retaining the inherent resolution of the photosensitive element, so that the second image frame has a high resolution and a low light sensitivity. By fusing the at least one first image frame and the at least one second image frame, the resolution and the light sensitivity of the fused image may be balanced to enhance an image quality.

The technical solutions provided in the embodiments of the present disclosure are described below by using specific examples.

Figure 2:
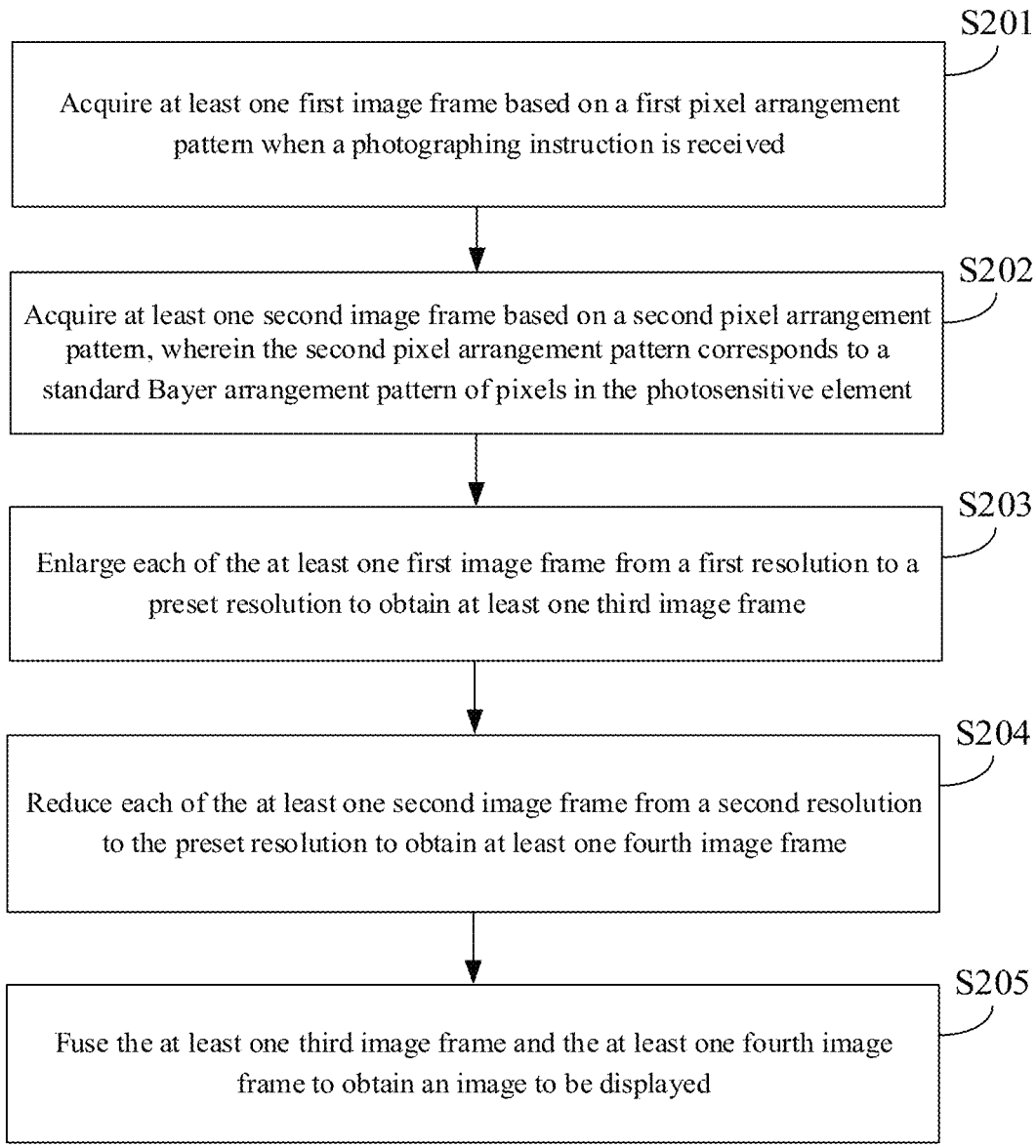
FIG. 2 is a flowchart illustrating a method of processing an image according to another exemplary embodiment.

FIG. 2 is a flowchart illustrating a method of processing an image according to another exemplary embodiment. This embodiment uses the method provided in the above-described embodiments of the present disclosure to exemplify how to generate an image to be displayed based on the at least one first image frame and the at least second image frame. As shown in FIG. 2, the method of processing an image includes the following steps.

In step S201, at least one first image frame is acquired based on a first pixel arrangement pattern when a photographing instruction is received, where a pixel in the first pixel arrangement pattern may include a plurality of sub-pixels of the same color component distributed in a square array in a photosensitive element. In one or more embodiments, each pixel in the first pixel arrangement pattern corresponds to a plurality of sub-pixels of the same color component distributed in a square array in a photosensitive element. Here, when receiving the photographing instruction, the photosensitive element collects at least one raw image frame, and merges the plurality of pixels of the same color component distributed in a square array in the raw image frame into one pixel in the first pixel arrangement pattern, thereby obtaining the first image frame.

In step S202, at least one second image frame is acquired based on a second pixel arrangement pattern, wherein the second pixel arrangement pattern corresponds to a standard Bayer arrangement pattern of pixels in the photosensitive element. The standard Bayer arrangement pattern is as shown in FIG. 1D.

For the description of steps S201-S202, please refer to the description of steps S101-S102 in the embodiment shown in FIG. 1A, which will not be described in detail herein.

In step S203, each of the at least one first image frame is enlarged from a first resolution to a preset resolution to obtain at least one third image frame.

Figure 3:
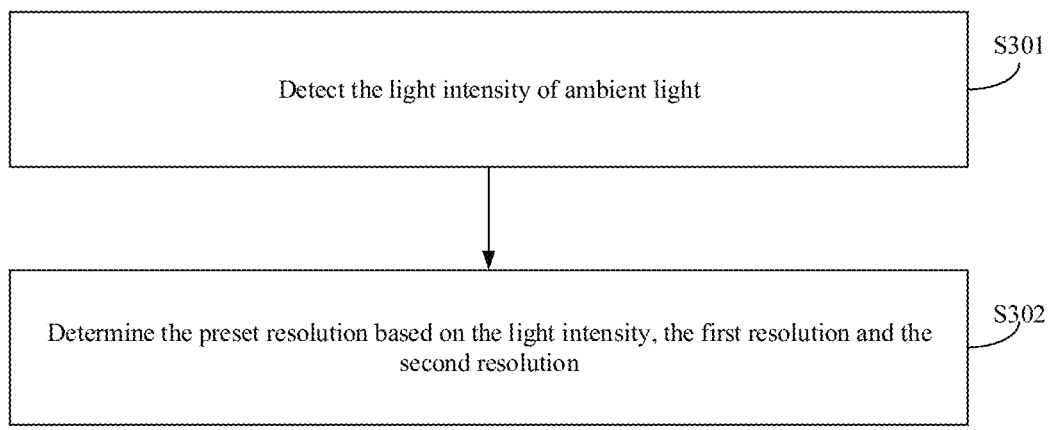
FIG. 3 is a flowchart illustrating a method for determining a preset resolution according to an exemplary embodiment.
Figure 4A:
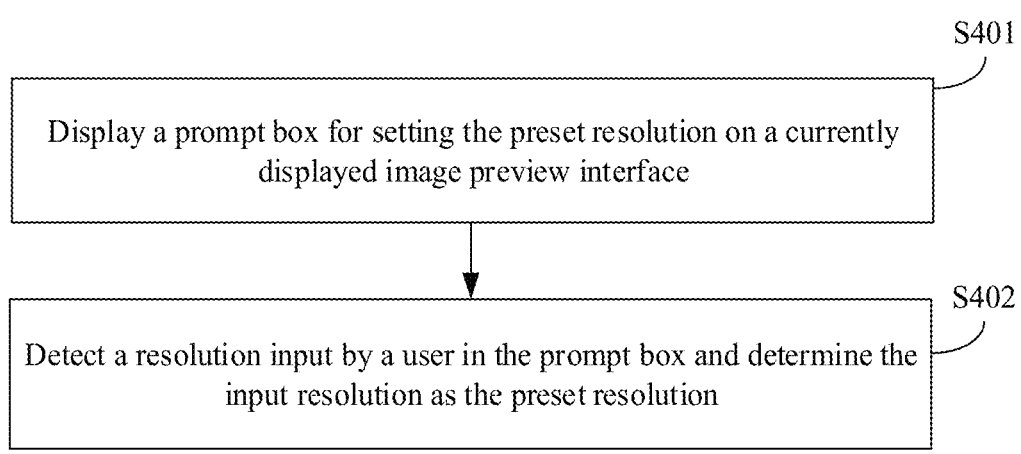
FIG. 4A is a flowchart illustrating a method for determining a preset resolution according to another exemplary embodiment.

For the description of how to determine the preset resolution, please refer to the embodiments shown in FIGS. 3 and 4A, which are not described in detail in this embodiment. In an embodiment, the resolution enlargement algorithm for the first image frame can refer to the description of the related art, and no limitation is imposed on the resolution enlargement algorithm in this embodiment.

In step S204, each of the at least one second image frame is reduced from a second resolution to the preset resolution to obtain at least one fourth image frame.

In an embodiment, the resolution reduction algorithm for the second image frame can refer to the description of the related art, and no limitation is imposed on the resolution reduction algorithm in this embodiment.

In an embodiment, the magnitude between the second resolution and the first resolution is determined by the dimension of the square array. For example, if the square array has a dimension of N×N, the first resolution is one of (N×N) fractions of the second resolution. For example, if the square array has a dimension of 2×2, the second resolution is 5120×3840, and the first resolution is 2560×1920. It can be seen that the first resolution is one quarter of the inherent resolution of the photosensitive element, and the second resolution is equal to the inherent resolution of the photosensitive element. For example, as shown in FIG. 1B, if the inherent resolution of the photosensitive element is 16×16, the first resolution is 4×4 as shown in FIG. 1C, and the second resolution is 16×16 as shown in FIG. 1D.

In step S205, the at least one third image frame and the at least one fourth image frame are fused to obtain an image to be displayed.

In an embodiment, at least one fifth RGB image frame corresponding to the at least one third image frame may be obtained by interpolating each of the at least one third image frame. The at least one fifth RGB image frame is fused to obtain a sixth RGB image. Similarly, at least one seventh RGB image frame corresponding to the at least one fourth image frame may be obtained by interpolating each of the at least one fourth image frame. The at least one seventh RGB image frame is fused to obtain an eighth RGB image. Finally, the sixth RGB image and the eighth RGB image are fused to obtain an image to be displayed.

In an embodiment, it is also possible to perform edge sharpening, image enhancement, and other processing on the image to be displayed, thereby further improving the visual experience of users.

In this embodiment, by adjusting the at least one first image frame and the at least one second image frame to the at least one third image frame and the at least one fourth image frame having the same resolution, the at least one third image frame and the at least one fourth image frame having the same resolution are fused to obtain an image to be displayed. Since each of the at least one third image frame retains a high signal-to-noise ratio of the data of the raw image frame collected by the photosensitive element, and each of the at least one fourth image frame retains a high resolution of the data of the raw image frame collected by the photosensitive element, both of the high signal-to-noise ratio and the high resolution of the image to be displayed obtained based on the at least one third image frame and the at least one fourth image frame can be still taken into consideration to enhance the image quality.

FIG. 3 is a flowchart illustrating a method for determining a preset resolution according to an exemplary embodiment. This embodiment uses the method provided in the above-described embodiments of the present disclosure to exemplify how to determine the preset resolution. As shown in FIG. 3, the method for determining the preset resolution includes the following steps.

In step S301, the light intensity of ambient light is detected. In an embodiment, the brightness of the entire image may be determined from the raw image frame collected by an image sensor as the photosensitive element, and the light intensity of the ambient light may be determined based on the brightness. In another embodiment, the light intensity of the ambient light may be detected by a light sensor disposed on the electronic device with the image sensor.

In step S302, the preset resolution is determined based on the light intensity, the first resolution and the second resolution. In an embodiment, a table representing the correspondence between the light intensity and the preset resolution is provided. When the light intensity is greater than or equal to a first threshold, the preset resolution is set equal to the second resolution. When the light intensity is less than or equal to a second threshold, the preset resolution is set equal to the first resolution. When the light intensity is less than the first threshold and greater than the second threshold, the preset resolution corresponding to the light intensity may be found according to the table representing the correspondence between the light intensity and the preset resolution. Wherein, the first threshold is greater than the second threshold. For example, the first threshold is 800 Lux and the second threshold is 100 Lux. The table representing the correspondence can refer to table 1 below.

TABLE 1

| Light intensity | Preset resolution |
| --- | --- |
| <100 Lux | 2560 × 1920 |
| 150 Lux | 2000 × 1000 |
| . . . | . . . |
| 750 Lux | 5000 × 3000 |
| >800 Lux | 5120 × 3840 |

The preset resolution is determined based on the magnitude relationship of the light intensity with the first threshold and the second threshold, the first resolution, and the second resolution. In this way, it is ensured that the resolution of the image to be displayed may vary with the light intensity, and it is also ensured that the image to be displayed may exhibit better image quality and higher resolution.

The method for determining the preset resolution shown in FIG. 3 may be performed either before the step S203 in the embodiment shown in FIG. 2 is performed or when any of the steps S201 to S202 is performed. The present disclosure does not limit the timing of obtaining the preset resolution as long as it is ensured that a reasonable preset resolution can be obtained when performing the step S203.

In this embodiment, the preset resolution is determined based on the light intensity, the first resolution and the second resolution. When the light intensity is different, the obtained preset resolution is also different, and further, the resolution of the image to be displayed obtained by fusing the at least one third image frame and the at least one fourth image frame varies with the light intensity. When the light intensity is high, the image to be displayed may have a higher resolution. When the light intensity is low, the image to be displayed may have a higher definition and signal-to-noise ratio. Based on this, it ensures that the image to be displayed can have a better resolution and signal-to-noise ratio depending on the light intensity.

Figure 4B:
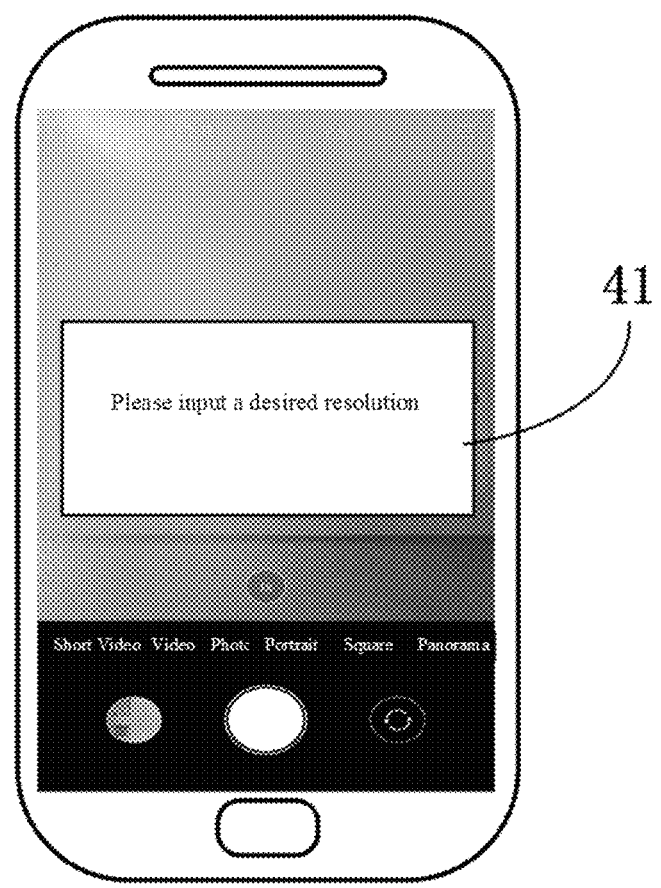
FIG. 4B is a schematic view illustrating setting options in the embodiment shown in FIG. 4A.

FIG. 4A is a flowchart illustrating a method for determining a preset resolution according to another exemplary embodiment. FIG. 4B is a schematic view illustrating setting options in the embodiment shown in FIG. 4A. This embodiment uses the method provided in the above-described embodiments of the present disclosure to exemplify how to determine the preset resolution. As shown in FIG. 4A, the method for determining the preset resolution includes the following steps.

In step S401, a prompt box for setting the preset resolution is displayed on a currently displayed image preview interface.

In step S402, a resolution input by a user in the prompt box is detected, and the input resolution is determined as the preset resolution.

As shown in FIG. 4B, on the currently displayed image preview interface, a prompt box 41 may be displayed to prompt the user to input a desired photo resolution. After the user inputs the preset resolution in the prompt box 41 and triggers a photographing button, the resolution of a generated photo is the preset resolution.

In this embodiment, setting the preset resolution on the currently displayed image preview interface enables the user to select an appropriate resolution according to the specific needs thereof, thereby improving the user's photographing experience.

The method for determining the preset resolution shown in FIG. 4A may be performed either before the step S203 in the embodiment shown in FIG. 2 is performed or when any of the steps S201-S202 is performed. The present disclosure does not limit the timing of obtaining the preset resolution as long as it is ensured that a reasonable preset resolution can be obtained when performing step S203.

Figure 5:
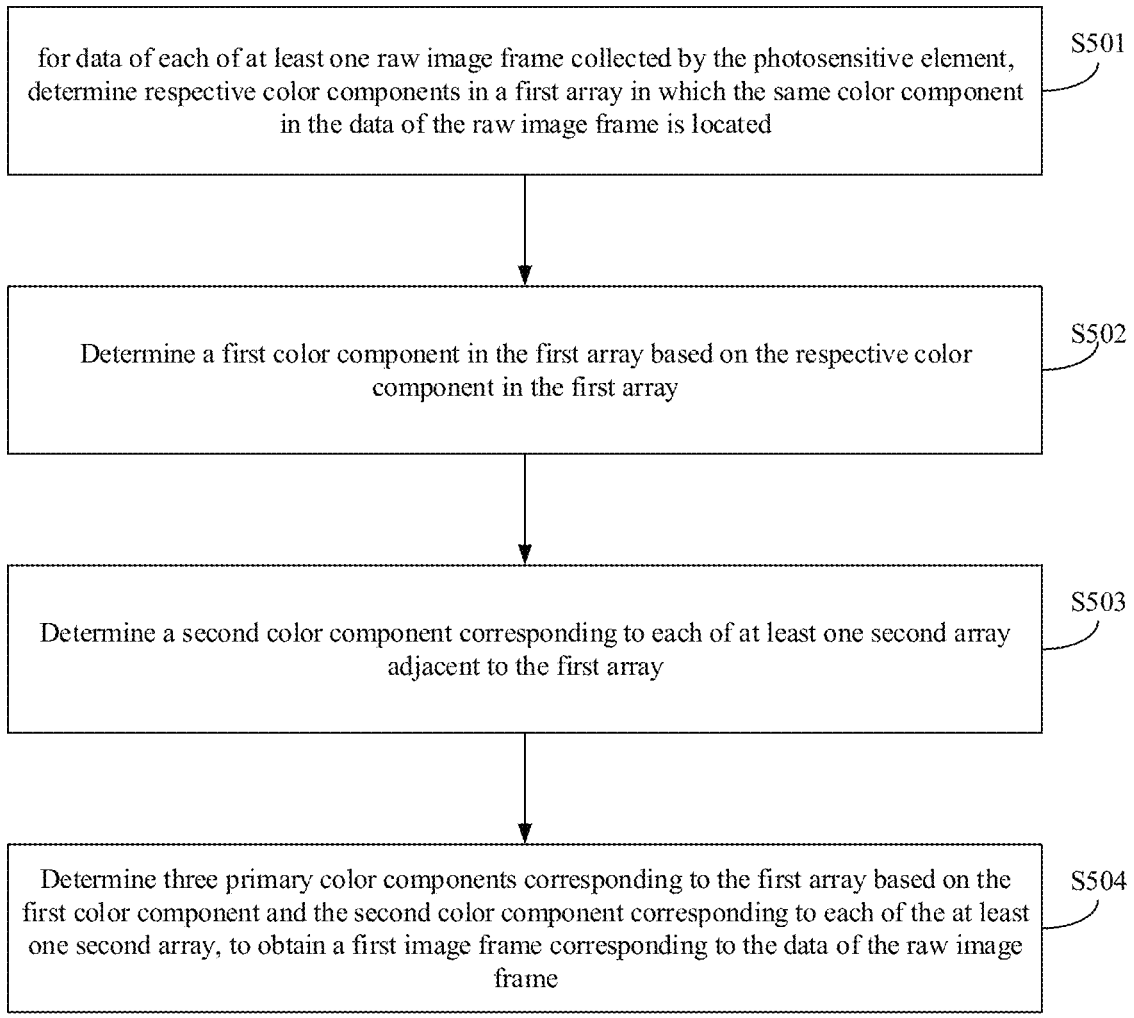
FIG. 5 is a flowchart illustrating step S101 in the embodiment shown in FIG. 1A.

FIG. 5 is a flowchart illustrating step S101 in the embodiment shown in FIG. 1A. This embodiment uses the method provided in the above-described embodiments of the present disclosure to exemplify how to determine at least one first image frame in conjunction with FIGS. 1B and 1C. As shown in FIG. 5, step S101 includes the following steps:

In step S501, with regard to data of each of at least one raw image frame collected by the photosensitive element, respective color components in a first array in which the same color component in the data of the raw image frame is located are determined.

In an embodiment, the data of one raw image frame collected by the photosensitive element as shown in FIG. 1B is in units of a 2×2 array. For example, if the coordinates of the upper left corner of the first array are (3, 3), and the coordinates of the lower right corner of the first array are (4, 4), the four G color components in the first array are determined, and the color values of the four G color components in the first array are further determined.

In step S502, a first color component in the first array is determined based on the respective color component in the first array.

In an embodiment, the first color component in the first array may be obtained by summing and averaging the color values of the four color components in the first array.

In step S503, a second color component corresponding to each of at least one second array adjacent to the first array is determined.

As shown in FIG. 1B, the coordinates of the upper left corner of the first array are (3, 3), the coordinates of the lower right corner of the first array are (4, 4), and the at least one second array adjacent to the first array may include second arrays corresponding to a R component and second arrays corresponding to a B component. The second arrays corresponding to the R component include: a second array formed by coordinates (1, 3) of the upper left corner and coordinates (2, 4) of the lower right corner, and a second array formed by coordinates (5, 3) of the upper left corner and coordinates (6, 4) of the lower right corner. The second arrays corresponding to the B component include: a second array formed by coordinates (3, 1) of the upper left corner and coordinates (4, 2) of the lower right corner, and a second array formed by coordinates (3, 5) of the upper left corner and coordinates (4, 6) of the lower right corner.

Based on a calculation method similar to that of the first array formed by coordinates (3, 3) of the upper left corner and coordinates (4, 4) of the lower right corner, the second color component corresponding to each of the above-described four second arrays is obtained. The respective color components are arranged in the first pixel arrangement pattern as shown in FIG. 1C.

In step S504, three primary color components corresponding to the first array are determined based on the first color component and the second color component corresponding to each of the at least one second array, to obtain a first image frame corresponding to the data of the raw image frame.

As shown in FIG. 1C, taking the G color component at (2, 2) as an example, the R color component at (2, 2) may be determined based on the R color components adjacent to the G color component. The B color component at (2, 2) may be determined based on the B color components adjacent to the G color component. Similar processing is performed on data of the entire raw image frame to obtain the first image frame corresponding to the data of the raw image frame. Here, the first image frame is an RGB color image frame.

In the embodiment shown in FIG. 5, the at least one first image frame is obtained based on the first pixel arrangement pattern, and each of the at least one first image frame is an RGB color image frame, which may reduce the complexity of fusing the at least one first image frame and the at least one second image frame subsequently.

Figure 6:
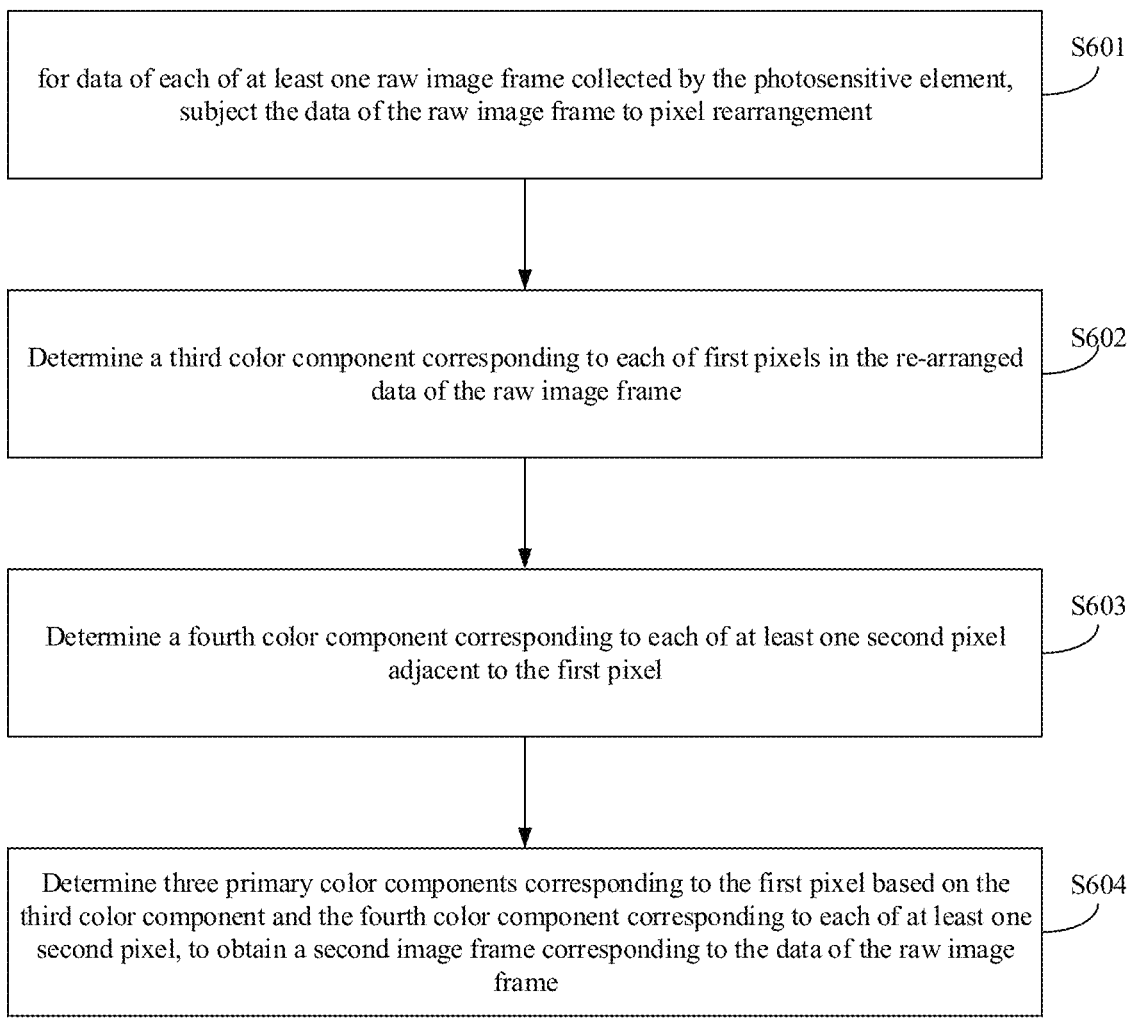
FIG. 6 is a flowchart illustrating step S102 in the embodiment shown in FIG. 1A.

FIG. 6 is a flowchart illustrating step S102 in the embodiment shown in FIG. 1A. This embodiment uses the method provided in the above-described embodiments of the present disclosure to exemplify how to determine at least one second image frame in conjunction with FIGS. 1B and 1D. As shown in FIG. 6, step 102 includes the following steps.

In step S601, with regard to data of each of at least one raw image frame collected by the photosensitive element, the data of the raw image frame is subjected to pixel rearrangement.

In an embodiment, the data of one raw image frame collected by the photosensitive element as shown in FIG. 1B is converted to the second pixel arrangement pattern as the standard Bayer arrangement pattern shown in FIG. 1D based on the pixel rearrangement technique in the related art.

In step S602, a third color component corresponding to each of first pixels in the re-arranged data of the raw image frame is determined.

As shown in FIG. 1D, taking the coordinates (2, 2) of the first pixel as an example, the third color component corresponding to the first pixel is B component, and the color value of the B component is obtained from the re-arranged data of the raw image frame.

In step S603, a fourth color component corresponding to each of at least one second pixel adjacent to the first pixel is determined.

As shown in FIG. 1D, taking the coordinates (2, 2) of the first pixel as an example, at least one second pixel adjacent to the first pixel includes pixels corresponding to the R component adjacent to the first pixel and pixels corresponding to the G component adjacent to the first pixel. The pixels corresponding to the R component adjacent to the first pixel include: coordinates (1, 1), coordinates (1, 3), coordinates (3, 1), and coordinates (3, 3). The pixels corresponding to the G component adjacent to the first pixel include: coordinates (1, 2), coordinates (2, 1), coordinates (2, 3), and coordinates (3, 2).

The fourth color component at corresponding coordinates may be determined based on the above coordinates.

In step S604, three primary color components corresponding to the first pixel are determined based on the third color component and the fourth color component corresponding to each of at least one second pixel, to obtain a second image frame corresponding to the data of the raw image frame.

As shown in FIG. 1D, taking the B color component at (2, 2) as an example, the R color component at (2, 2) may be determined based on the R color component adjacent to the B color component. The G color component at (2, 2) may be determined based on the G color component adjacent to the B color component. Similar processing is performed on the re-arranged data of the entire raw image frame to obtain the second image frame corresponding to the data of the entire raw image frame. Here, the second image frame is an RGB color image frame.

In the embodiment shown in FIG. 6, the at least one second image frame is obtained based on the second pixel arrangement pattern, and each of the at least one second image frame is an RGB color image frame, which may reduce the complexity of fusing the at least one first image frame and the at least one second image frame subsequently.

In an embodiment, a method for performing image fusion includes, but is not limited to, wavelet image fusion, HIS image fusion, and the like, which are well known to those skilled in the art.

Figure 7:
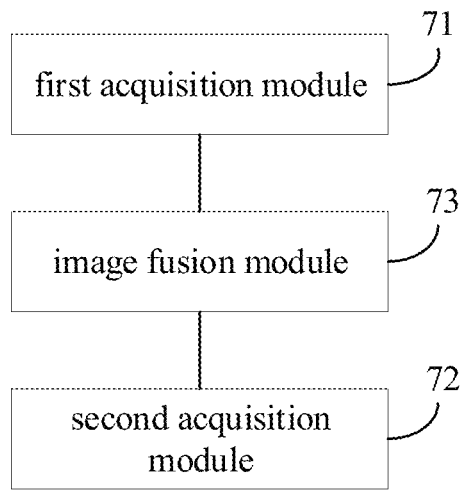
FIG. 7 is a block diagram illustrating an apparatus for processing an image according to an exemplary embodiment.

FIG. 7 is a block diagram illustrating an apparatus for processing an image according to an exemplary embodiment. As shown in FIG. 5, the apparatus for processing an image includes:

a first acquisition module 71 configured to acquire at least one first image frame based on a first pixel arrangement pattern when receiving a photographing instruction, wherein each pixel in the first pixel arrangement pattern corresponds to pixels of the same color component distributed in a square array in a photosensitive element;

a second acquisition module 72 configured to acquire at least one second image frame based on a second pixel arrangement pattern, wherein the second pixel arrangement pattern is a standard Bayer arrangement pattern; and an image fusion module 73 configured to fuse the at least one first image frame and the at least one second image frame to obtain an image to be displayed.

Figure 8:
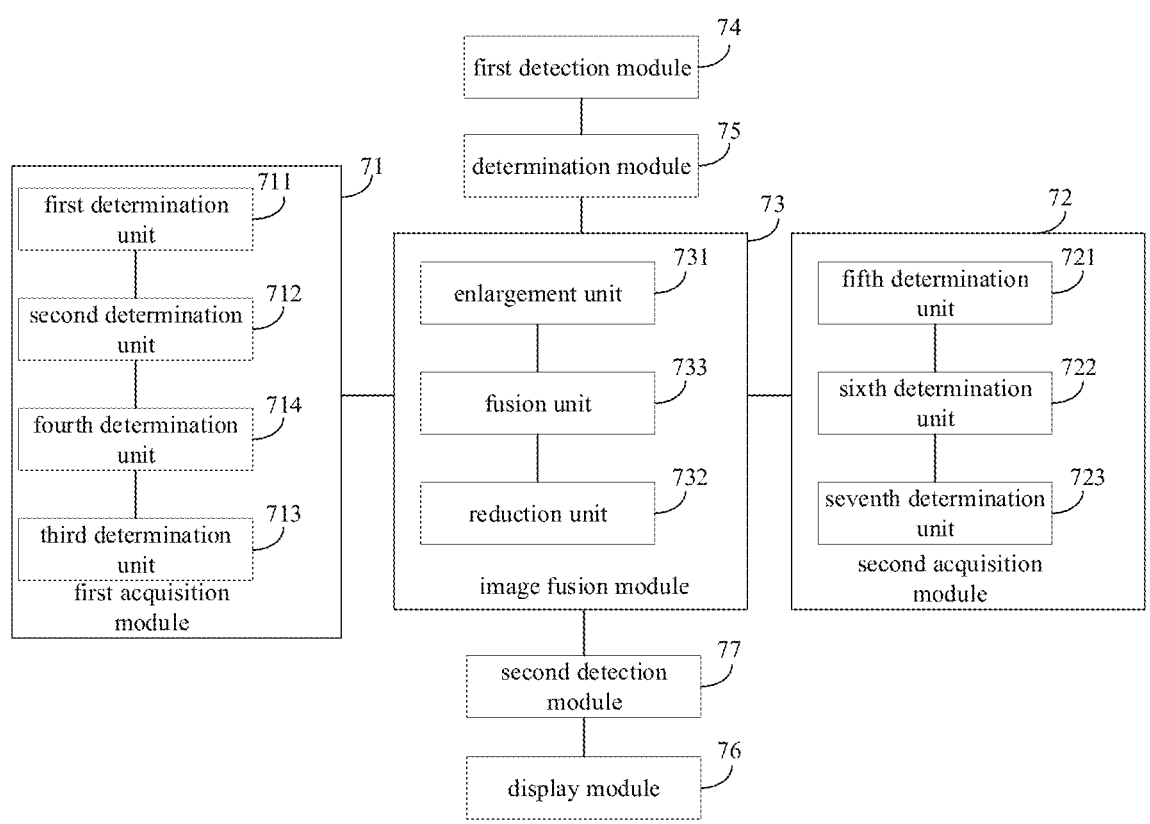
FIG. 8 is a block diagram illustrating an apparatus for processing an image according to another exemplary embodiment.

FIG. 8 is a block diagram illustrating an apparatus for processing an image according to another exemplary embodiment. As shown in FIG. 8, on the basis of the embodiment shown in FIG. 7, the image fusion module 73 may include:

an enlargement unit 731 configured to enlarge each of the at least one first image frame from a first resolution to a preset resolution to obtain at least one third image frame;

a reduction unit 732 configured to reduce each of the each of the at least one second image frame from a second resolution to the preset resolution to obtain at least one fourth image frame; and a fusion unit 733 configured to fuse the at least one third image frame and the at least one fourth image frame to obtain the image to be displayed.

In an embodiment, the apparatus for processing an image further includes:

a first detection module 74 configured to detect a light intensity of ambient light; and a determination module 75 configured to determine the preset resolution based on the detected light intensity, the first resolution, and the second resolution.

In an embodiment, the apparatus for processing an image further includes:

a display module 76 configured to display a prompt box for setting the preset resolution on a preview interface for displaying an image; and a second detection module 77 configured to detect a resolution input in the prompt box displayed by the display module 76, and determine the resolution as the preset resolution.

In an embodiment, the first acquisition module 71 may include:

a first determination unit 711 configured, with regard to data of each of at least one raw image frame collected by the photosensitive element, to determine respective color components in a first array in which the same color component in data of the raw image frame is located;

a second determination unit 712 configured to determine a first color component in the first array based on the respective color components in the first array;

a third determination unit 713 configured to determine a second color component corresponding to each of at least one second array adjacent to the first array; and a fourth determination unit 714 configured to determine three primary color components corresponding to the first array based on the first color component and the second color component corresponding to each of the at least one second array, to obtain a first image frame corresponding to the data of the raw image frame. A demosaic operation is performed based on the first color component in the first array and the second color component corresponding to each of the at least one second array to obtain the three primary color components corresponding to the first array.

In an embodiment, the second acquisition module 72 may include:

a fifth determination unit 721 configured, with regard to data of each of at least one raw image frame collected by the photosensitive element, to subject the data of the raw image frame to pixel rearrangement, and to determine a third color component corresponding to each of first pixels in the re-arranged data of the raw image frame;

a sixth determination unit 722 configured to determine a fourth color component corresponding to each of at least one second pixel adjacent to the first pixel; and a seventh determination unit 723 configured to determine, based on the third color component and the fourth color component corresponding to the at least one second pixel, three primary color components corresponding to the first pixel, to obtain a first image frame corresponding to the data of the raw image frame.

In an embodiment, the first pixel arrangement pattern is a Quad Bayer arrangement pattern.

Figure 9:
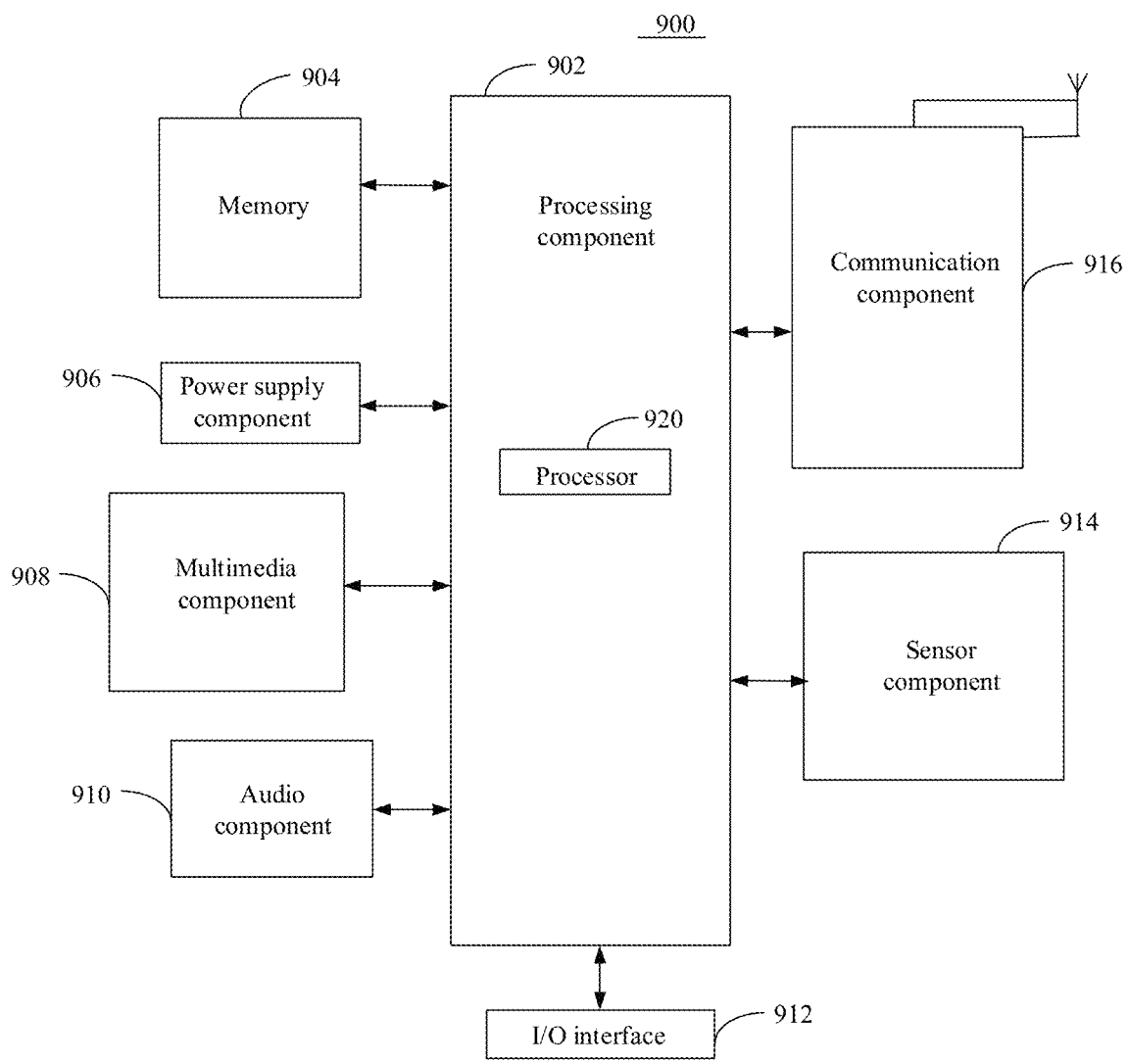
FIG. 9 is a block diagram illustrating an apparatus for processing an image according to still another exemplary embodiment.

FIG. 9 is a block diagram illustrating an apparatus for processing an image according to still another exemplary embodiment. For example, the apparatus 900 may be a mobile phone, a computer, a digital broadcasting terminal, a messaging device, a gaming console, a tablet device, a medical equipment, a fitness equipment, a personal digital assistant, and the like.

Referring to FIG. 9, the apparatus 900 can include one or more of the following components: a processing component 902, a memory 904, a power supply component 906, a multimedia component 908, an audio component 910, an input/output (I/O) interface 912, a sensor component 914, and a communication component 916.

The processing component 902 typically controls the overall operation of the apparatus 900 such as operations associated with display, telephone calls, data communication, camera operation, and recording operation. The processing component 902 may include one or more processors 920 to execute instructions so as to complete all or part of the steps described above. Moreover, the processing component 902 may include one or more modules to facilitate interaction between the processing component 902 and other components. For example, the processing component 902 may include a multimedia module to facilitate interaction between the multimedia component 908 and the processing component 902.

The memory 904 is configured to store various types of data so as to support operation at the apparatus 900. Examples of such data include instructions for any applications or methods operating at the apparatus 900, contact data, telephone book data, messages, pictures, videos, and the like. The memory 904 may be implemented by any type of volatile or non-volatile storage devices, or a combination thereof, such as a static random access memory (SRAM), an electrically erasable programmable read only memory (EEPROM), an erasable, programmable read only memory (EPROM), a programmable read only memory (PROM), a read only memory (ROM), a magnetic memory, a flash memory, a disk or an optical disk.

The power supply component 906 provides power to various components of the apparatus 900. Power supply component 906 may include a power supply management system, one or more power supplies, and other components associated with generating, managing, and distributing power for the apparatus 900.

The multimedia component 908 includes a screen between the apparatus 900 and a user that provides an output interface. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensor may sense not only the boundaries of a touch or swipe, but also the duration and pressure associated with the touch or swipe. In some embodiments, the multimedia component 908 includes a front camera and/or a rear camera. When the apparatus 900 is in an operation mode, such as a photographing mode or a video mode, the front camera and/or the rear camera may receive external multimedia data. Each of the front camera and the rear camera may be a fixed optical lens system or have focal length and optical zoom capabilities.

The audio component 910 is configured to output and/or input an audio signal. For example, the audio component 910 includes a microphone (MIC) that is configured to receive an external audio signal when the apparatus 900 is in an operation mode, such as a call mode, a recording mode, and a voice recognition mode. The received audio signal may be further stored in the memory 904 or transmitted via communication component 916. In some embodiments, the audio component 910 also includes a speaker configured to output an audio signal.

The I/O interface 912 provides an interface between the processing component 902 and a peripheral interface module, which may be a keyboard, a click wheel, a button, or the like. These buttons may include, but are not limited to, a home button, a volume button, a start button, and a lock button.

The sensor component 914 includes one or more sensors configured to provide various aspects of state assessment to the apparatus 900. For example, the sensor component 914 may detect an open/closed state of the apparatus 900, and relative positioning of components. For example, the components are a display and a keypad of the apparatus 900. The sensor component 914 may also detect a change in position of the apparatus 900 or a component of the apparatus 900, the presence or absence of a user in contact with the apparatus 900, a change in orientation or acceleration/deceleration and temperature of the apparatus 900. The sensor component 914 may include a proximity sensor configured to detect the presence of nearby objects without any physical contact. The sensor component 914 may also include a light sensor, such as a Complementary Metal-Oxide-Semiconductor (CMOS) or Charged Coupled Device (CCD) image sensor, for use in imaging applications. In some embodiments, the sensor component 914 may also include an acceleration sensor, a gyro sensor, a magnetic sensor, a pressure sensor, or a temperature sensor.

The communication component 916 is configured to facilitate wired or wireless communication between the apparatus 900 and other devices. The apparatus 900 may access a wireless network based on communication standards, such as WiFi, 2G, 3G, 4G or 5G, or a combination thereof. In an exemplary embodiment, the communication component 916 receives a broadcast signal or broadcast associated information from an external broadcast management system via a broadcast channel. In an exemplary embodiment, the communication component 916 also includes a near field communication (NFC) module to facilitate short-range communication. For example, the NFC module may be implemented based on radio frequency identification (RFID) technology, infrared data association (IrDA) technology, ultra-wideband (UWB) technology, Bluetooth® (BT) technology, and other technologies.

In an exemplary embodiment, the apparatus 900 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements for performing the above-described methods.

In an exemplary embodiment, there is also provided a non-transitory computer readable storage medium storing instructions, for example, a memory 904 storing computer instructions. The processor 920 of the apparatus 900 executes the computer instructions to perform the method of processing an image described above. For example, the non-transitory computer readable storage medium may be a ROM, a random access memory (RAM), a CD-ROM, a magnetic tape, a floppy disk, and an optical data storage device.

Other embodiments of the present disclosure will be readily apparent to those skilled in the art after considering the specification and practicing the contents disclosed herein. The present application is intended to cover any variations, uses, or adaptations of the present disclosure, which follow the general principles of the present disclosure and include the common knowledge or conventional technical means in the art that are not disclosed in the present disclosure. The specification and embodiments are to be regarded as illustrative only. The true scope and spirit of the present disclosure is pointed out by the appended claims.

It should be understood that the present disclosure is not limited to the precise structures that have been described above and illustrated in the drawings, and various modifications and changes can be made without departing from the scope thereof. The scope of the present disclosure is to be limited only by the appended claims.

What is claimed is:

1. A method for processing an image, comprising:
   acquiring at least one first image frame based on a first pixel arrangement pattern when receiving a photographing instruction, wherein a pixel in the first pixel arrangement pattern includes sub-pixels of the same color component distributed in a square array in a photosensitive element;
   acquiring at least one second image frame based on a second pixel arrangement pattern, wherein the second pixel arrangement pattern is a standard Bayer arrangement pattern;
   detecting a light intensity of ambient light;
   determining a preset resolution based on the light intensity, a first resolution and a second resolution; and
   fusing the at least one first image frame and the at least one second image frame to obtain the image to be displayed by:
     enlarging each of the at least one first image frame from the first resolution to the preset resolution to obtain at least one third image frame;
     reducing each of the at least one second image frame from the second resolution to the preset resolution to obtain at least one fourth image frame; and
     fusing the at least one third image frame and the at least one fourth image frame to obtain the image to be displayed.

2. The method according to claim 1, further comprising:
   displaying a prompt box for setting the preset resolution on a preview interface for displaying an image;
   detecting a resolution input in the prompt box; and
   determining the resolution as the preset resolution.

3. The method according to claim 1, wherein fusing the at least one third image frame and the at least one fourth image frame to obtain the image to be displayed comprises:
   interpolating each of the at least one third image frame to obtain at least one fifth red, green and blue (RGB) image frame;
   fusing the at least one fifth RGB image frame to obtain a sixth RGB image;
   interpolating each of the at least one fourth image frame to obtain at least one seventh RGB image frame;
   fusing the at least one seventh RGB image frame to obtain an eighth RGB image;
   fusing the sixth RGB image and the eighth RGB image to obtain the image to be displayed.

4. The method according to claim 1, wherein acquiring the at least one first image frame based on the first pixel arrangement pattern comprises:
   obtaining data of at least one raw image frame collected by the photosensitive element;
   with regard to the data of each of the at least one raw image frame,
     determining respective color components in a first array in which the same color component in the data of the raw image frame is located;
     determining a first color component in the first array based on the respective color components in the first array;
     determining a second color component corresponding to each of at least one second array adjacent to the first array; and
     determining three primary color components corresponding to the first array based on the first color component and the second color component corresponding to each of the at least one second array, to obtain a first image frame corresponding to the data of the raw image frame.

5. The method according to claim 1, wherein acquiring the at least one second image frame based on the second pixel arrangement pattern comprises:
   obtaining data of at least one raw image frame collected by the photosensitive element;
   with regard to the data of each of the at least one raw image frame,
     subjecting the data of the raw image frame to pixel rearrangement;
     determining a third color component corresponding to each of first pixels in the re-arranged data of the raw image frame;
     determining a fourth color component corresponding to each of at least one second pixel adjacent to the first pixel; and
     determining three primary color components corresponding to the first pixel based on the third color component and the fourth color component corresponding to each of the at least one second pixel, to obtain a second image frame corresponding to the data of the raw image frame.

6. The method according to claim 1, wherein the first pixel arrangement pattern is a Quad Bayer arrangement pattern.

7. An electronic device, comprising:
   a processor; and
   a memory configured to store processor executable instructions,
   wherein the processor is configured to execute:
   acquiring at least one first image frame based on a first pixel arrangement pattern when receiving a photographing instruction, wherein a pixel in the first pixel arrangement pattern includes sub-pixels of the same color component distributed in a square array in a photosensitive element;

acquiring at least one second image frame based on a second pixel arrangement pattern by:
  obtaining data of at least one raw image frame collected by the photosensitive element;
  with regard to the data of each of the at least one raw image frame,
    subjecting the data of the raw image frame to pixel rearrangement;
    determining a third color component corresponding to each of first pixels in the re-arranged data of the raw image frame;
    determining a fourth color component corresponding to each of at least one second pixel adjacent to the first pixel; and
    determining three primary color components corresponding to the first pixel based on the third color component and the fourth color component corresponding to each of the at least one second pixel, to obtain a second image frame corresponding to the data of the raw image frame;
  wherein the second pixel arrangement pattern is a standard Bayer arrangement pattern; and
    fusing the at least one first image frame and the at least one second image frame to obtain the image to be displayed.

8. The electronic device according to claim 7, wherein fusing the at least one first image frame and the at least one second image frame to obtain the image to be displayed comprises:
  enlarging each of the at least one first image frame from a first resolution to a preset resolution to obtain at least one third image frame;
  reducing each of the at least one second image frame from a second resolution to the preset resolution to obtain at least one fourth image frame; and
  fusing the at least one third image frame and the at least one fourth image frame to obtain an image to be displayed.

9. The electronic device according to claim 8, wherein the processor is further configured to execute:
  detecting a light intensity of ambient light; and
  determining the preset resolution based on the light intensity, the first resolution and the second resolution.

10. The electronic device according to claim 8, wherein the processor is further configured to execute:
  displaying a prompt box for setting the preset resolution on a preview interface for displaying an image;
  detecting a resolution input in the prompt box; and
  determining the resolution as the preset resolution.

11. The electronic device according to claim 8, wherein fusing the at least one third image frame and the at least one fourth image frame to obtain the image to be displayed comprises:
  interpolating each of the at least one third image frame to obtain at least one fifth RGB image frame;
  fusing the at least one fifth RGB image frame to obtain a sixth RGB image;
  interpolating each of the at least one fourth image frame to obtain at least one seventh RGB image frame;
  fusing the at least one seventh RGB image frame to obtain an eighth RGB image;
  fusing the sixth RGB image and the eighth RGB image to obtain the image to be displayed.

12. The electronic device according to claim 8, wherein acquiring the at least one first image frame based on the first pixel arrangement pattern comprises:
  obtaining data of at least one raw image frame collected by the photosensitive element;
  with regard to the data of each of the at least one raw image frame,
    determining respective color components in a first array in which the same color component in the data of the raw image frame is located;
    determining a first color component in the first array based on the respective color components in the first array;
    determining a second color component corresponding to each of at least one second array adjacent to the first array;
    determining three primary color components corresponding to the first array based on the first color component and the second color component corresponding to each of the at least one second array, to obtain a first image frame corresponding to the data of the raw image frame.

13. The electronic device according to claim 7, wherein the first pixel arrangement pattern is a Quad Bayer arrangement pattern.

14. A non-transitory computer readable storage medium storing computer instructions, when invoking the computer instructions, a processor is configured to execute:
  acquiring at least one first image frame based on a first pixel arrangement pattern when receiving a photographing instruction, wherein a pixel in the first pixel arrangement pattern includes sub-pixels of the same color component distributed in a square array in a photosensitive element;
  acquiring at least one second image frame based on a second pixel arrangement pattern, wherein, the second pixel arrangement pattern is a standard Bayer arrangement pattern;
  detecting a light intensity of ambient light;
  determining a preset resolution based on the light intensity, a first resolution and a second resolution; and
  fusing the at least one first image frame and the at least one second image frame to obtain the image to be displayed by:
    enlarging each of the at least one first image frame from the first resolution to the preset resolution to obtain at least one third image frame;
    reducing each of the at least one second image frame from the second resolution to the preset resolution to obtain at least one fourth image frame; and
    fusing the at least one third image frame and the at least one fourth image frame to obtain the image to be displayed.

* * * * *